United States Patent [19]

Ohashi et al.

[11] 4,145,318

[45] Mar. 20, 1979

[54] EXCELLENT FLAME-AND SMOKE-RETARDANT NON-SHRINKABLE POLYURETHANE FOAM

[75] Inventors: Takashi Ohashi, Iruma; Toru Okuyama, Sagamihara; Katsuhiko Arai, Kodaira; Yoshiko Taniguchi, Higashi-Murayama; Masumi Saito, Tanashi; Ryozo Sakata, Higashi-Yamato, all of Japan

[73] Assignee: Bridgestone Tire Company Limited, Tokyo, Japan

[21] Appl. No.: 821,015

[22] Filed: Aug. 1, 1977

[30] Foreign Application Priority Data

Jul. 30, 1976 [JP] Japan .................................. 51-90165

[51] Int. Cl.$^2$ .............................................. C08J 9/00
[52] U.S. Cl. ...................... 521/112; 521/167; 521/903
[58] Field of Search .................... 260/2.5 AM, 2.5 AQ

[56] References Cited

U.S. PATENT DOCUMENTS

| | | | |
|---|---|---|---|
| 3,738,953 | 6/1973 | Anorga | 260/2.5 AM |
| 3,816,360 | 6/1974 | Taub | 260/2.5 AM |
| 3,925,266 | 12/1975 | Fabris | 260/2.5 AM |
| 3,926,867 | 12/1975 | Quock | 260/2.5 AM |
| 4,060,439 | 11/1977 | Rosemund | 260/2.5 AQ |

*Primary Examiner*—Lewis T. Jacobs
*Attorney, Agent, or Firm*—Sughrue, Rothwell, Mion, Zinn & Macpeak

[57] ABSTRACT

An excellent flame- and smoke-retardant non-shrinkable polyurethane foam is prepared by reacting a polyhydroxyl compound consisting of (A) a polyol having at least two hydroxyl groups and having a molecular weight of from 1,000 to 10,000, and (B) an aliphatic amino alcohol, the amount of which is 2.1 to 8.0 equivalents per hydroxyl group of the polyol (A) with an organic polyisocyanate in the presence of water and/or other blowing agents, catalysts and surfactants.

The polyurethane foam thus obtained has high resilience together with an improved S.A.G. factor.

16 Claims, No Drawings

EXCELLENT FLAME-AND SMOKE-RETARDANT NON-SHRINKABLE POLYURETHANE FOAM

BACKGROUND OF THE INVENTION (1) Field of the Invention

The present invention relates to an excellent flame- and smoke-retardant non-shrinkable polyurethane foam and to a process for producing the same.

(2) Description of the Prior Art

It has been already known to produce polyurethane foams by reacting polyhydroxyl compounds with polyisocyanates in the presence of water and/or other blowing agents, catalysts and surfactants and the like.

Various foams such as flexible, semi-rigid and rigid polyurethane foams can be obtained depending upon the number of functional group, the molecular weight and the skeleton structure of polyhydroxyl compounds and polyisocyanates used and hence such foams are widely used for the production of cushioning materials and seats for furniture, vehicles, aircraft and ships, and materials for cloths and buildings. However, the use of the polyurethane foams having flame-retardance has recently been demanded for complying with said uses.

Moreover, the legal regulations regarding the use of flame- and smoke-retardant polyurethane foams become more strict year after year, and this tendency is noticeable in the case of polyurethane foams used for motorcars, railway vehicles, aircraft and ships.

Heretofore, various attempts have been made to impart flame retardance to polyurethane foams. As conventional methods, there is known the use of addition type flame retardants, such as phosphorus-containing compounds, halogen- and phosphorus-containing compounds, antimony oxide and other metal oxides, or the use of reaction type flame retardants. It is, also, well known that introduction of ring structure having a heat resistance, such as an isocyanurate linkage and imido linkage, into the polyurethane molecule is effective as a means of providing the flame-retardance to the polyurethane foams. However, in the former case, the general physical properties of the resulting foam lower and the smoke emission upon burning tends to increase significantly, and in the latter case, the foaming stability becomes poor and the obtained foam is apt to become rigid.

The inventers have already found a method for producing a flame- and smoke-retardant flexible polyurethane foam by using a low molecular weight polyhydroxyl compund in combination with conventional polyol in an amount of 0.5 to 2.0 equivalents per hydroxyl group of said polyol in a hot cure foaming system without adding any flame-retardants.

The resulting plyurethane foam is judged to have self-extinguishing by the burning test (ASTM D-1692 -59T).

However, the foam obtained by using a low molecular weight polyhydroxyl compound is liable to form closed cells and therefore readily shrinks in a short time after foaming.

Especially, in the process of mass production of slab stock, it is an important problem to prevent such shrinkage after foaming, thereupon the means to solve such problem has been earnestly required.

In order to prevent the shrinkage of the foam originated by the closed cell, two processes are well known; one is a mechanical method so called "crushing" and the other is a method of compounding a cell opening agent so called "cell-opener." These two processes have been used alone or in combination. However, the former requires a large scale facility and a proper selection of reaction condition, and the latter is apt to accompany the heterogeneity of cells at foaming and is poor in the foaming stability and in the flame- and smoke-reterdance of the resulting foams.

The inventors have further examined the means to prevent the shrinkage of the foams and have already provided a method for producing non-shrinkable flexible polyurethane foams having flame- and smoke-retardance by adding some kinds of ammonium compounds that generate ammonia gas at a heating temperature below 100° C., into the raw materials in the foaming system, when the above described low molecular weight polyhydroxyl compound is used as a part of polyol. However, in this method, the ammonium compound used is the crystalline particle and is apt to precipitate upon foaming. Therefore, the obtained product becomes a heterogeneous foam due to the low dispersion of said ammonium compound.

SUMMARY OF THE INVENTION

It is, therefore, an object of the present invention to provide a non-shrinkable flame- and smoke-retardant polyurethane foam.

It is another object of the present invention to provide a flame- and smoke-retardant polyurethane foam having good general physical properties.

Accordingly, the aspect of the present invention is to provide an excellent flame- and smoke-retardant non-shrinkable polyurethane foam prepared by reacting a polyhydroxyl compound consisting of (A) a polyol having at least two hydroxyl groups and having a molecular weight of from 1,000 to 10,000 and (B) an aliphatic amino alcohol of 2.1 to 8.0 equivalents per hydroxyl group of the polyol (A) with an organic polyisocyanate in the presence of water and/or other blowing agents, catalysts and surfactants.

According to the present invention, a polyurethane foam having an excellent flame- and smoke-retardance can be produced without using any flame retardants, such as phosphorus-containing compounds and halogen-containing compounds.

Furthermore, according to the present invention, a non-shrinkable polyurethane foam can be produced without using a mechanical method so called "crushing" or a cell opening agent so called "cell opener."

In addition, the polyurethane foam according to the present invention has a high resilience and an improved S.A.G. factor together with good general physical properties, therefore, the resulting foam is widely applied for the production of the slab stock foam used for the cushioning materials, heat insulation, sound insulation, packaging and for the manufacture of molded foams, for example furniture seats, bucket seats for automobiles, railway vehicles, aircraft, and ships.

DESCRIPTION OF THE PREFERRED EMBODIMENT

The polyhydroxyl compounds used in the present invention may be a mixture of a polyol (A) and an aliphatic amino alcohol (B). The polyol (A) may be suitably polyether polyols, polyester polyols and polyether-ester polyols. And these polyols can be selected depending upon the property of the aimed polyurethane foam.

The polyether polyol may be suitably a polyol obtained by the addition polymerization of an alkylene oxide, such as ethylene oxide and propylene oxide to an initiator containing active hydrogen atoms, such as propylene glycol, glycerin, trimethylolpropane, 1,2,6-hexanetriol, pentaerythritol, ethylenediamine, sorbitol and saccharose. Further, the polyether polyol may be a random or block copolymeric polyol prepared by the sequential addition polymerization of two or more of these alkylene oxides to said initiator.

The polyester polyol may be suitably a polyol obtained by the polycondensation reaction of a polybasic acid, such as adipic acid, succinic acid, maleic acid and phthalic acid with an initiator containing active hydrogen atoms, such as ethylene glycol, propylene glycol and butylene glycol, or by the ring opening polymerization of a lactone. The polyetherester polyol may be suitably a polyol obtained by the polycondensation reaction of an above described polybasic acid with an initiator having ether bonds, such as diethylene glycol, and triethylene glycol.

The number average molecular weight and hydroxyl value of the polyol should be varied according to whether the polyurethane foam is to be flexible, semi-rigid or rigid. In the production of flexible or semi-rigid polyurethane foam, polyols having a number average molecular weight of 1,000 to 10,000 and a hydroxyl value of 20 to 170 mgKOH/g. are used alone or in admixture. In the present invention, polyether polyols are preferably used as the polyol. Among them, poly(oxyalkylene) polyols, particularly poly(oxypropylene) triol or poly(oxyethvlene-oxypropylene) triol having a number average molecular weight of 3,000 to 6,000, which is obtained by the addition polymerization of propylene oxide or ethylene oxide and propylene oxide to glycerine and is generally used in the production of commonly used flexible or semi-rigid polyurethane foam, are preferably used.

The aliphatic amino alcohol (B) to be used in admixture with the polyol (A) may be suitably diethanolamine, diisopropanolamine, triethanolamine, hydroxyethylated ethylenediamine, hydroxypropylated diethylenetriamine, 2-amino-2-methyl-1,3-propanediol, 2-amino-2-ethyl-1,3-propanediol and tris(hydroxymethyl) aminomethane. Among them, there may be preferably used diethanolamine, triethanolamine, diisopropanolamine and 2-amino-2-ethyl-1,3-propanediol in order to prepare the non-shrinkable flexible polyurethane foam having excellent flame- and smoke-retardance and high foaming stability.

In the present invention, when using an alphatic alcohol instead of the aliphatic amino alcohol, the aimed polyurethane foam can not be obtained.

The molecular weight of the aliphatic amino alcohol (B) should be varied according to the molecular weight of the polyol (A) to be used. However, in the production of a flexible or semi-rigid polyurethane foam, the aliphatic amino alcohol having a molecular weight of 80 to 500, and a hydroxyl value of 160 to 600 mgKOH/g is preferably used alone or in admixture.

The amount of the aliphatic amino alcohol to be used in the present invention is within the range of 2.1 to 8.0 equivalents per hydroxyl group of the polyol (A). The use of less than 2.0 equivalents of the aliphatic amino alcohol (B) is not favorable in the foaming stability and can not provide the polyurethane foam which has sufficient flame-retardance, and passes the burning test of A-A Standard (thickness of test specimen: 30 mm). And when using more than 8.0 equivalents of the aliphatic amino alcohol, a favorable polyurethane foam can not be obtained and the total hydroxyl value becomes large upon foaming, so that a large amount of polyisocyanate is necessary and the foaming stability is liable to become poor. Especially, the aliphatic amino alcohol can be preferably used within the range of 3.0 to 7.0 equivalents.

The amount of the aliphatic amino alcohol based on the polyol used in the present invention can not be (easily) anticipated from the prior art. Because, in the production of a foam having a high resilience, which commonly referred to as "H.R. foam," the low molecular weight polyhydroxyl compound, such as diethanolamine and glycerin had been desirably used in an amount of one equivalent per hydroxyl group of a polyol, and it had been considered that the use of more than one equivalent of diethanolamine should lower the general physical properties of the resulting foam. (TECHNICAL BULLETIN "THE ROLE OF POLYMER POLYOLS IN MODERN POLYURETHANE TECHNOLOGY" by G. K. HULL, Union Carbide Europe S. A. Chemicals and Phastics Laboratory, Geneva Switzerland, at The Institute of the Plastics and Rubber Industry Symposium, 25th–26th March, 1975.)

One of the polyisocyanates that may be generally used in the present invention is tolylene diisocyanate. Particularly tolylene diisocyanate, wherein the 2,4- and 2,6-isomers are mixed in a ratio of 80/20 or 65/35 (weight ratio), is preferable in view of its low cost and utility. Crude tolylene diisocyanate may be used. Other polyisocyanates that may be used are pure or crude diphenylmethane diisocyanate, biphenyl diisocyanate, chlorophenyl-2,4-diisocyanate, p-phenylene diisocyanate, xylylene diisocyanate, and polymethylene-polyphenyl isocyanate or mixtures of these polyisocyanates with tolylene diisocyanate.

The amount of polyisocyanate used is preferably such as to provide an isocyanate index (NCO index) in the range of 80 to 130, but when considering the balance of the flame retardance and the smoke retardance to the general physical properties of the obtained polyurethane foam, the isocyanate index is preferred to be in the range of 95 to 110.

The catalysts used in the present invention may be suitably those catalysts used in the art. The catalysts include organometallic compounds, such as stannous octoate and dibutyltin dilaurate; and amines, such as triethylenediamine, triethylamine, N-methylmorpholine, N-ethylmorpholine, tetramethylbutanediamine, pentamethyldiethylenetriamine, N.N-dimethyl ethanolamine and bis-(β-dimethylaminoethyl) ether. The above described catalysts can be used alone or in admixture. The amount of catalyst to be used in the present invention is not particularly limited and can be varied within a wide range. However, the catalyst is generally used in an amount of 0.001 to 5.0 parts by weight, preferably 0.01 to 2.0 parts by weight, based on 100 parts by weight of the polyol (A).

The surfactant or cell stabilizer to be used in the present invention is preferably a commonly known silicone surfactant, and may be selected from polydialkylsiloxanes and polysiloxane-polyalkylene oxide block copolymers. The kind and amount of the silicone surfactant used are not particularly limited. The amount of the silicone surfactant and is suitably 0.005 to 3.0 parts by weight, preferably 0.05 to 2.0 parts by weight, based on 100 parts by weight of the polyol (A).

As the other additive to be used in the present invention, there may be used a blowing agent which serves to control the general physical properties and density of the resulting polyurethane foam. The blowing agent is water or a volatile liquid having a low boiling point. When water is used as a blowing agent, it is preferred to use water in an amount of less than 5.0 parts by weight based on 100 parts by weight of the polyol (A) in order to obtain a polyurethane foam having a sufficient flame-retardance. As a volatile liquid having a low boiling point, which is effectively used to prevent a heat build-up upon foaming and control the density of the resulting foam, there may be used methylene chloride, chloroform, monofluorotrichloromethane, monochlorodifluoromethane and dichlorodifluoromethane. These blowing agents described above can be used alone or in admixture.

In the present invention, a conventional flame retardant, such as halogenated phosphoric acid esters, can be used to give a higher flame retardance to the resulting polyurethane foam. A halogenated phosphoric acid esters, mention may be made of tris(2-chloroethyl) phosphate, tris(2-cloropropyl) phosphate, tris(2,3-dichloropropyl) phosphate, tris(2-bromopropyl) phosphate, tris(2,3-dibromopropyl) phosphate, tris(bromochloropropyl) phosphate, dichloropropyl-bis(dibromopropyl) phosphate and poly-$\beta$-chloroethyl-triphosphonate. These flame retardants can be used alone or in admixture in an amount of less than 10 parts by weight based on 100 parts by weight of the polyol (A). Further, in the present invention, a pigment and a filler may be added.

The production of the polyurethane foams according to the present invention can be carried out by the usual processes. For example, a one shot process, wherein the polyisocyanate is added to a homogeneous mixture of the polyol, the catalyst, the surfactant and other assistants to cause reaction and foaming, and the so-called prepolymer process, wherein a part or the total amount of the polyol is previously reacted with the total amount of the polyisocyanate to form a prepolymer and then the prepolymer is mixed with the other components to cause foaming, are usually adopted.

The polyurethane foams obtained in the present invention have a density of 0.020 to 0.080 g/cm³. If desired, the density of the foams is further controlled by adding water, another blowing agent or a low molecular weight polyhydroxyl compound, or by selecting the kind of polyol or polyisocyanate, whereby flexible and semi-rigid polyurethane foams can be produced.

The following examples are given for the purpose of illustration of this invention and are not intended as limitations thereof. In the examples, "parts" means parts by weight unless otherwise indicated.

In the examples, the general physical properties were measured according to JIS K6301 and K6401. The burning test was carried out according to ASTM D-1692-59T, MVSS302 and A-A Standard. A-A Standard specifies the testing method for determining flame-retardance of the materials for a railway vehicle, and is prescribed according to the notification of the Ministry of Transportation of Japan. The testing method is as follows. The size of the specimen is 257 mm in length and 181 mm in width. The specimen is held at an angle of 45° and an alcohol pan with 0.5 cc of ethylalcohol is set on a stand made of a heat insulator, such as cork in such a state, that the distance between the rear surface of the center of the specimen foam and the center of the alcohol pan is 25.4 mm. The burning of ethyl alcohol is continued until all ethylalcohol is used up. The flame-retardance is judged by observing a burning state of the specimen, such as the occurrence of the ignition and the flame, the amount of smoke emission, a state of flame, and the burned state of the specimen, such as the remaining flame, cinder and a deformation of the specimen. In the example, the test was carried out by using the specimen having a thickness of 30 mm. The classification of the flame-retardance is required to satisfying the judgement defined in the following table.

| Testing Item | Burning State | | | | Burned State | | |
| --- | --- | --- | --- | --- | --- | --- | --- |
| | igniting | flaming | the amount of smoke | the force of the flame | the remaining of flame | cinder | deformation |
| Judgement | occur | occur | medium | the flame does not pass over the upper part of the specimen | none | none | the deformation from the center to the edge, a piercing hole is observed at the center portion of the specimen. |

The smoke emission test was carried out in the following manner. One g of a sample foam is burnt in an electrical furnace having an inner diameter of 100 mm and a depth of 250 mm by means of an electrical heating wire of 3 KW in air flow having a pressure of 0.5 kg/cm² and a rate of 2.0 l/min, and the generated smoke is gathered in a box of 50 × 50 × 50 cm. A maximum value of the extinction coefficient per unit weight of the sample is measured by means of a photoelectric detector, and expressed by smoke generation coefficient $C_{Smax}(m^{-1})$. The smoke retardance of a foam was judged by the smoke generation coefficient. The smaller is the coefficient, the higher the smoke retardance is.

EXAMPLE 1

To 100 parts of poly(oxyethylene-oxypropylene) triol containing primary hydroxyl group of 60 to 70% of the total hydroxyl content, and having a number average molecular weight of about 5,300, and a hydroxyl value of 32 (trademark; FA-703, made by Sanyo Chemical Industries, Ltd.) were added successively 8.0 parts (corresponding to 4.0 equivalents based on hydroxyl group of said triol) of diethanol amine 3.0 parts of water, 0.3 part of DABCO 33 LV (trademark, 33% solution of triethylene diamine in dipropylene glycol, made by Houdry Process Corp.) as an amine catalyst, 0.1 part of A-1 (trademark, solution consisting of 70 parts of bis-($\beta$-dimethylaminoethyl) ether and 30 parts of dipropylene glycol, made by Union Carbide Corp.,) as an amine catalyst, 0.1 part of N-methyl morpholine as an amine catalyst, 0.15 part of stannous octoate as a catalyst and 0.6 part of a silicone surfactant F-121 (trademark, made by Shinetsu Chemical Co., Ltd.), and the resulting mixture was thoroughly stirred for about 30 seconds.

When the resulting homogenous mixture was stirred at a high speed together with 52.5 parts (NCO index: 97.6) of tolylene diisocyanate TDI-80 (2,4-isomer/2,6-isomer = 80/20), a reaction began to start, and the reaction mixture became creamy in about 5 seconds (cream time). When the creamy mixture was immediately poured into a paper mold, the creamy mixture began to foam, and the rising of foam was completed after 90 seconds (rise time).

The resulting polyurethane foam had few closed cells and was a high resilient non-shrinkable foam.

The polyurethane foam obtained above had a burning extent of 32 mm and showed an excellent self-extinguishing according to the burning test of ASTM D-1692-59T, and further passed both flame-test of MVSS-302 and A-A Standard. The smoke emission coefficient $C_{Smax}$ of the foam was 0.67 m$^{-1}$ which is lower than $C_{Smax}$ of 0.87 m$^{-1}$ of the ordinarily used polyurethane foam and $C_{Smax}$ of 1.03 m$^{-1}$ of the conventional flame-retardant polyurethane foam, which has been prepared by adding 25 parts of tris-(2,3-dichloropropyl) phosphate as a flame-retardant and the foam obtained in this example showed a very low smoke emission.

The general physical properties of the resulting foam were measured by JIS K6301 and 6401. The foam had a density of 0.0318 g/cm$^3$, a 25% ILD of 5.9 kg, a 65% ILD of 16.7 kg, a tensile strength of 0.70 kg/cm$^2$, an elongation of 100%, a tear strength of 0.31 kg/cm, a resilience of 57% and a compression set (50% deflection, 70° C., 22 hours) of 3.5%.

It can be seen from the above obtained results that the polyurethane foam according to the present invention is excellent in the flame retardance and is low in the smoke emission and further has a high resilience together with an improved S.A.G. factor relating to comfort of the foam.

Example 2 and 3, Comparative Example 1~3

In the similar manner as described in Example 1, a foaming procedure was conducted, except that the amount of diethanolamine was varied as shown in the following Table 1.

The general physical properties of the resulting foams and the results of the burning test are shown in Table 1.

Table 1(a)

| | | Comparative Example 1 | Comparative Example 2 | Comparative Example 3 | Example 2 | Example 3 |
|---|---|---|---|---|---|---|
| Composition | Polyol (part) | 100 | 100 | 100 | 100 | 100 |
| | Diethanolamine | — | 2.0 | 4.0 | 6.4 | 10.0 |
| | (Hydroxyl equivalent ratio*) | (0) | (1.0) | (2.0) | (3.3) | (5.1) |
| | Water | 3.0 | 3.0 | 3.0 | 3.0 | 3.0 |
| | DABCO 33LV | — | 0.3 | 0.3 | 0.3 | 0.1 |
| | A-1 | — | 0.15 | 0.15 | 0.15 | 0.1 |
| | N-methylmorpholine | — | 0.4 | 0.4 | 0.4 | 0.1 |
| | Stannous octoate | 2.0 | — | 0.07 | 0.10 | 0.20 |
| | Silicone surfactant (F-121) | 2.0 | 0.3 | 0.3 | 0.3 | 2.0 |
| | TDI-80 | 33.1 | 37.9 | 42.8 | 48.5 | 57.3 |
| | (NCO index) | 97.6 | 97.6 | 97.6 | 97.6 | 97.6 |
| Foaming behavior | Cream time (sec.) | 9 | 6 | 6 | 5 | 4 |
| | Rise time (sec.) | 47 | 103 | 97 | 88 | 67 |
| | Shrinkage | occur | occur | occur | not occur | not occur |
| Burning test | ASTMD-1692-59T Judgement | inflammable | self-extinguishing | self-extinguishing | self-extinguishing | self-extinguishing |
| | Burning extent (mm) | | 72 | 40 | 39 | 36 |
| | MVSS-302 Judgement | pass | pass | pass | pass | pass |
| | A-A Standard (Specimen thickness: 30 mm) Judgement | not pass | not pass | not pass | pass | pass |

*Ratio of hydroxyl equivalent of diethanolamine based on hydroxyl group of polyol.

Table 1(b)

| | | Comparative Example 1 | Comparative Example 2 | Comparative Example 3 | Example 2 | Example 3 |
|---|---|---|---|---|---|---|
| Smoke emission | $C_{Smax}$ (m$^{-1}$) | 0.89 | 0.80 | 0.77 | 0.62 | 0.77 |
| Physical properties | Density (g/cm$^3$) | 0.0312 | 0.0338 | 0.0310 | 0.0335 | 0.0330 |
| | 25% (kg/200 mm diameter) | 9.00 | 4.10 | 4.70 | 7.60 | 5.40 |
| | 65% (kg/200 mm diameter) | 19.50 | 11.80 | 13.75 | 18.20 | 18.50 |
| | Tensile strength (kg/cm$^2$) | 1.17 | 0.82 | 0.71 | 0.82 | 0.87 |
| | Elongation (%) | 330 | 140 | 135 | 95 | 100 |
| | Tear strength (kg/cm) | 0.84 | 0.29 | 0.34 | 0.32 | 0.32 |
| | Resilience (%) | 43 | 59 | 60 | 67 | 59 |
| | Compression set (%) (50% deflection, 70° C., 22 hrs.) | 9.63 | 5.90 | 2.86 | 2.15 | 4.60 |

It will be clear from the results as shown in table 1 that when an aliphatic amino alcohol of less than 2.0 equivalents based on the hydroxyl group of the polyol is used, the foaming stability is poor and the resulting foam is liable to shrink and further the resulting polyurethane foam cannot pass the burning test of A-A Standard, although said foam passes the burning test of ASTM D-1692-59T and MVSS-302. When using more than 2.1 equivalents of an aliphatic amino alcohol, it has been found that a favorable polyurethane foam having an excellent flame-retardance together with a low smoke emission and further having improved general physical properties, such as an ILD, a resilience and a compression set, can be produced.

Accordingly, it is an essential feature to use an aliphatic amino alcohol within the range defined in the present invention in order to pass the burning test of A-A Standard prescribed on a cushioning material of a railway vehicle.

EXAMPLE 4

The same foaming procedure as described in Example 2 was conducted, except that 2.5 parts of water and 43.5 parts (NCO index: 96.7) of TDI-80 were used. In the foaming procedure, the cream time was 5 seconds, the rise time was 110 seconds and healthy bubbles were generated. The resulting foam was a non-shrinkable high resilient polyurethane foam having uniform cell structure.

According to the burning test, the foam had a burning extent of 37 mm and excellent self-extinguishing in term of ASTM D-1692-59T, and further passed the burning test of MVSS-302 and A-A Standard. The smoke generation coefficient $C_{Smax}$ was 0.75 m$^{-1}$ and the foam had the low smoke emission. The foam had a density of 0.0385 g/cm$^3$, a 25% ILD of 8.0 kg, a 65% ILD of 21.6 kg, a tensile strength of 0.67 kg/cm$^2$, an elongation of 90%, a tear strength of 0.36 kg/cm, a resilience of 65% and a compression set (50% deflection, 70° C., 22 hours) of 2.0%.

EXAMPLE 5~8

The same foaming procedure as described in Example 1 was conducted, except that the kind and amount of a polyisocyanate and the use amount of a catalyst were varied as shown in the following Table 2.

The resulting foams were non-shrinkable high resilient polyurethane foams and showed an excellent flame- and smoke-retardance.

The general physical properties of the resulting foams and the results of the burning test are shown in Table 2.

Table 2

| | | Example 5 | Example 6 | Example 7 | Example 8 |
|---|---|---|---|---|---|
| Composition | Polyol (part) | 100 | 100 | 100 | 100 |
| | Diethanolamine | 8.0 | 8.0 | 8.0 | 8.0 |
| | (Hydroxyl equivalent ratio) | (4.0) | (4.0) | (4.0) | (4.0) |
| | Water | 3.0 | 3.0 | 3.0 | 3.0 |
| | DABCO 33LV | 0.3 | 0.3 | 0.3 | 0.35 |
| | A-1 | 0.1 | — | 0.1 | — |
| | N-methylmorpholine | 0.1 | 0.1 | 0.3 | 0.3 |
| | Stannous octoate | 0.15 | 0.15 | — | — |
| | Dibutyltin dilaurate | — | — | 0.05 | 0.05 |
| | Silicone surfactant (F-121) | 0.6 | 0.6 | 0.6 | 0.6 |
| | TDI-80 | 26.3 | — | 32 | 45.2 |
| | TDI-65* | 26.3 | 52.5 | — | — |
| | 44V** | — | — | 32 | 11.3 |
| | NCO index | 97.6 | 97.6 | 97.6 | 97.6 |
| Foaming behavior | Cream time (sec.) | 6 | 6 | 6 | 6 |
| | Rise time (sec.) | 54 | 62 | 41 | 62 |
| | Shrinkage | not occur | not occur | not occur | not occur |
| Burning test | ASTMD-1692-59T Judgement | self-extinguishing | self-extinguishing | self-extinguishing | self-extinguishing |
| | Burning extent (mm) | 30 | 33 | 93 | 65 |
| | MVSS-302 Judgement | pass | pass | pass | pass |
| | A-A Standard (Specimen thickness: 30 mm) Judgement | pass | pass | pass | pass |
| Smoke emission | $C_{Smax}$ (m$^{-1}$) | 0.78 | 0.78 | 0.88 | 0.64 |
| Physical properties | Density (g/cm$^3$) | 0.0320 | 0.0339 | 0.0414 | 0.0347 |
| | 25% (kg/200 mm diameter) | 7.50 | 9.75 | 9.25 | 6.30 |
| | 65% (kg/200 mm diameter) | 19.50 | 24.20 | 27.60 | 19.50 |
| | Tensile strength (kg/cm$^2$) | 0.78 | 0.64 | 0.79 | 0.70 |
| | Elongation (%) | 125 | 90 | 80 | 90 |
| | Tear strength (kg/cm) | 0.37 | 0.34 | 0.33 | 0.28 |
| | Resilience (%) | 62 | 61 | 66 | 65 |
| | Compression set (%) (50% deflection, 70° C., 22 hrs.) | 2.60 | 2.40 | 3.15 | 2.61 |

*Tolylene diisocyanate 2,4-/2,6-isomer 65/35
**Crude diphenylmethane diisocyanate

EXAMPLE 9~11 COMPARATIVE EXAMPLE 4~5

In the similar manner as described in Example 1, a foaming procedure was conducted according to the composition as shown in the following Table 3.

The general physical properties of the resulting foams and the results of the burning test are shown in Table 3.

Table 3(a)

| | Example 9 | Example 10 | Example 11 | Comparative Example 4 | Comparative Example 5 |
|---|---|---|---|---|---|
| Polyol (part) | 100 | 100 | 100 | 100 | 100 |
| Low molecular weight | TEA[1] | TEA | AEPD[2] | GLC[3] | TMP[4] |

Table 3(a)-continued

|  |  | Example 9 | Example 10 | Example 11 | Comparative Example 4 | Comparative Example 5 |
|---|---|---|---|---|---|---|
| Composition | polyhydroxyl compound | 11.36 | 11.36 | 9.07 | 7.02 | 10.20 |
|  | (Hydroxyl equivalent ratio) | (4.0) | (4.0) | (4.0) | (4.0) | (4.0) |
|  | Water | 3.0 | 3.0 | 3.0 | 3.0 | 3.0 |
|  | DABCO 33LV | 0.25 | 0.25 | 0.3 | 0.3 | 0.3 |
|  | A-1 | — | — | 0.15 | 0.15 | 0.2 |
|  | N-methylmorpholine | 0.3 | 0.3 | 0.4 | 0.4 | 0.4 |
|  | Stannous octoate | 0.05 | 0.05 | — | 0.05 | — |
|  | Silicone surfactant (F-121) | 0.6 | 0.6 | 0.6 | 0.5 | 0.3 |
|  | TDI-80 | 48.4 | 52.5 | 52.5 | 52.5 | 52.5 |
|  | NCO index | 90 | 97.6 | 97.6 | 97.6 | 97.6 |
| Foaming behavior | Cream time (sec.) | 8 | 8 | 4 | 19 | 7 |
|  | Rise time (sec.) | 80 | 85 | 60 | 90 | 80 |
|  | Shrinkage | not occur | not occur | not occur | occur | occur |
| Burning test | ASTMD-1692-59T Judgement | self-extinguishing | self-extinguishing | self-extinguishing | self-extinguishing | self-extinguishing |
|  | Burning extent (mm) | 76 | 68 | 42 | 58 | 52 |
|  | MVSS-302 Judgement | pass | pass | pass | pass | pass |
|  | A-A Standard (Specimen thickness: 30 mm) Judgement | pass | pass | pass | not pass | not pass |

[1]Triethanolamine,
[2]2-Amino-2-ethyl-1,3-propanediol,
[3]Glycerin,
[4]Trimethylol propane.

Table 3(b)

|  |  | Example 9 | Example 10 | Example 11 | Comparative Example 4 | Comparative Example 5 |
|---|---|---|---|---|---|---|
| Smoke emission | $C_{Smax}$ (m$^{-1}$) | 0.58 | 0.76 | 0.70 | 0.81 | 0.75 |
| Physical properties | Density (g/cm$^3$) | 0.0372 | 0.0364 | 0.0313 | 0.0337 | 0.0341 |
|  | 25% (kg/200 mm diameter) | 3.85 | 4.55 | 7.40 | 6.25 | 7.10 |
|  | 65% (kg/200 mm diameter) | 11.80 | 15.30 | 21.35 | 18.70 | 20.25 |
|  | Tensile strength (kg/cm$^2$) | 0.42 | 0.45 | 1.07 | 0.62 | 0.73 |
|  | Elongation (%) | 110 | 120 | 120 | 95 | 100 |
|  | Tear strength (kg/cm) | 0.17 | 0.18 | 0.40 | 0.19 | 0.24 |
|  | Resilence (%) | 48 | 36 | 60 | 60 | 62 |
|  | Compression set (%) (50% deflection, 70° C., 22 hrs.) | 4.54 | 5.52 | 5.88 | 2.43 | 3.96 |

EXAMPLE 12~16

In the similar manner as described in Example 1, a foaming procedure was conducted according to the composition as shown in the following Table 4. The resulting foams were non-shrinkable high resilient polyurethane foams having a excellent flame- and smoke-retardance.

The general physical properties of the resulting foams and the results of the burning test are shown in Table 4.

Table 4(a)

|  |  | Example 12 GP-3000[1] | Example 13 GP-3000 | Example 14 FA-702[2] | Example 15 FA-702 | Example 16 HF-511[3] |
|---|---|---|---|---|---|---|
| Composition | Polyol (part) | 100 | 100 | 100 | 100 | 100 |
|  | Diethanolamine | 8.0 | 12.0 | 8.0 | 8.0 | 8.0 |
|  | (Hydroxyl equivalent ratio) | (2.3) | (3.4) | (3.4) | (3.4) | (2.9) |
|  | Water | 3.0 | 2.5 | 3.0 | 3.0 | 3.0 |
|  | DABCO 33LV | 0.3 | 0.3 | 0.7 | 0.7 | 0.7 DABCO WT* |
|  | A-1 | 0.25 | 0.3 | 0.2 | 0.2 | 0.6 |
|  | N-methylmorpholine | 0.4 | 0.4 | 0.3 | 0.3 | 0.4 |
|  | Stannous octoate | 0.10 | 0.15 | 0.05 | 0.04 | 0.03 |
|  | Silicone surfactant (F-121) | 2.0 | 2.0 | 1.0 | 1.0 | 0.1 |
|  | TDI-80 | 55.9 | 60.8 | 53.5 | 56.5 | 54.5 |
|  | NCO Index | 97.0 | 97.0 | 97.6 | 103 | 97.6 |
| Foaming behavior | Cream time (sec.) | 5 | 4 | 4 | 4 | 5 |
|  | Rise time (sec.) | 110 | 90 | 74 | 76 | 80 |
|  | Shrinkage | not occur | not occur | not occur | not occur | not occur |
| Burning test | ASTMD-1692-59T Judgement | self-extinguishing | self-extinguishing | self-extinguishing | self-extinguishing | self-extinguishing |
|  | Burning extent (mm) | 41 | 44 | 37 | 46 | 34 |
|  | MVSS-302 Judgement A-A Standard (Specimen thickness: 30 mm) | pass | pass | pass | pass | pass |

Table 4(a)-continued

|  | Example 12 GP-3000[1] | Example 13 GP-3000 | Example 14 FA-702[2] | Example 15 FA-702 | Example 16 HF-511[3] |
|---|---|---|---|---|---|
| Judgement | pass | pass | pass | pass | pass |

*Triethylenediamine derivative (made by Houdry Process Corp.)
[1]Poly(oxypropylene)-triol (made by Sanyo Chemical Industries, Ltd., hydroxyl value: 56)
[2]Poly(oxypropylene-oxyethylene)tetraol (made by Sanyo Chemical Industries, Ltd., hydroxyl value: 38)
[3]Poly(oxypropylene-oxyethylene)triol (made by Daiichi Seiyaku Kogyo Co., Ltd., hydroxyl value: 45)

Table 4(b)

|  |  | Example 12 | Example 13 | Example 14 | Example 15 | Example 16 |
|---|---|---|---|---|---|---|
| Smoke emmission | $C_{Smax}$ (m$^{-1}$) | 0.88 | 0.80 | 0.76 | 0.70 | 0.77 |
| Physical properties | Density (g/cm$^3$) | 0.0310 | 0.0353 | 0.0351 | 0.0346 | 0.0320 |
|  | 25% (kg/200 mm diameter) | 5.50 | 8.85 | 5.00 | 5.40 | 3.10 |
|  | 65% (kg/200 mm diameter) | 14.20 | 20.60 | 19.10 | 19.20 | 15.80 |
|  | Tensile strength (kg/cm$^2$) | 0.55 | 0.26 | 0.50 | 0.60 | 0.70 |
|  | Elongation (%) | 125 | 60 | 80 | 80 | 150 |
|  | Tear strength (kg/cm) | 0.32 | 0.22 | 0.23 | 0.34 | 0.54 |
|  | Resilience (%) | 57 | 54 | 60 | 53 | 50 |
|  | Compression set (%) 70° C, 22 hrs.) | 3.95 | 5.53 | 6.02 | 9.80 | 8.40 |

EXAMPLE 17~21 COMPARATIVE EXAMPLE 6~8

In the similar manner as described in Example 1, a foaming procedure was conducted according to the composition as shown in the following Table 5, wherein a polyol blend consisting of poly (oxyethylene-oxypropylene) triol FA-703 and poly(oxypropyle-oxyethylene) triol having a hydroxyl value of 56, (trademark: Propylan 333, made by Daiichi Kogyo Seiyaku Co., Ltd.) was used in the blend ratio of 50:50.

The general physical properties of the resulting foams and the results of the burning test are shown in Table 5.

Table 5(a)

|  |  | Comparative Example 6 | Comparative Example 7 | Comparative Example 8 | Example 17 | Example 18 | Example 19 | Example 20 | Example 21 |
|---|---|---|---|---|---|---|---|---|---|
| Composition | Polyol, FA-703 (part) | 50 | 50 | 50 | 50 | 50 | 50 | 50 | 50 |
|  | Polyol, Propylene 333 | 50 | 50 | 50 | 50 | 50 | 50 | 50 | 50 |
|  | Diethanolamine | — | 2.0 | 4.0 | 6.4 | 8.0 | 10.0 | 6.4 | 6.4 |
|  | (Hydroxyl equivalent ratio) | (0) | (0.7) | (1.5) | (2.4) | (2.9) | (3.7) | (2.4) | (2.4) |
|  | Water | 3.0 | 3.0 | 3.0 | 3.0 | 3.0 | 3.0 | 2.5 | 4.0 |
|  | DABCO 33LV | 0.3 | 0.3 | 0.3 | 0.3 | 0.3 | 0.3 | 0.3 | 0.3 |
|  | A-1 | 0.15 | 0.15 | 0.15 | 0.15 | 0.15 | 0.15 | 0.15 | 0.15 |
|  | N-methylmorpholine | 0.4 | 0.4 | 0.4 | 0.4 | 0.4 | 0.4 | 0.4 | 0.4 |
|  | Stannous octoate | 0.2 | 0.05 | 0.05 | 0.04 | 0.05 | 0.05 | 0.05 | 0.04 |
|  | Silicon surfactant (F-121) | 2.0 | 2.0 | 2.0 | 2.0 | 2.0 | 2.0 | 2.0 | 2.0 |
|  | TDI-80 | 36.9 | 41.1 | 45.4 | 50.4 | 53.9 | 58.2 | 45.4 | 60.5 |
|  | NCO index | 103 | 101 | 99.3 | 97.7 | 96.8 | 96.0 | 96.9 | 98.6 |
| Foaming behavior | Cream time (sec.) | 6 | 6 | 5 | 5 | 4 | 4 | 5 | 5 |
|  | Rise time (sec.) | 67 | 110 | 97 | 118 | 112 | 117 | 110 | 127 |
|  | Shrinkage | occur | occur | occur | not occur | not occur | not occur | not occur | not occur |

Table 5(b)

|  |  | Comparative Example 6 | Comparative Example 7 | Comparative Example 8 | Example 17 | Example 18 | Example 19 | Example 20 | Example 21 |
|---|---|---|---|---|---|---|---|---|---|
| Burning test | ASTMD-1692-59T Judgement | inflammable | self-extinguishing | self-extinguishing | self-extinguishing | self-extinguishing | self-extinguishing | self-extinguishing | self-extinguishing |
|  | MVSS-302 Judgement | pass | pass | pass | pass | pass | pass | pass | pass |
|  | A-A Standard (Specimen thickness: 30 mm) Judgement | not pass | not pass | not pass | pass | pass | pass | pass | pass |
| Smoke emission | $C_{Smax}$ (m$^{-1}$) | 0.94 | 0.92 | 0.83 | 0.71 | 0.77 | 0.71 | 0.74 | 0.86 |
| Physical properties | Density (g/cm$^3$) | 0.0324 | 0.0322 | 0.0339 | 0.0343 | 0.0320 | 0.0322 | 0.0399 | 0.0255 |
|  | 25% (kg/200 mm diameter) | 11.65 | 5.90 | 5.90 | 6.05 | 5.50 | 4.60 | 8.15 | 4.60 |
|  | 65% (kg/200 mm diameter) | 24.65 | 15.10 | 16.90 | 16.20 | 15.50 | 14.90 | 22.10 | 14.00 |
|  | Tensile strength (kg/cm$^2$) | 1.12 | 0.72 | 0.86 | 0.87 | 0.90 | 0.80 | 0.89 | 1.02 |
|  | Elongation (%) | 210 | 130 | 130 | 110 | 170 | 110 | 100 | 175 |
|  | Tear strength (kg/cm) | 0.76 | 0.42 | 0.39 | 0.46 | 0.50 | 0.46 | 0.44 | 0.59 |
|  | Resilience (%) | 30 | 47 | 50 | 57 | 54 | 55 | 62 | 54 |
|  | Compression set (%) (50% deflection 70° C, 22 hrs.) | 4.71 | 8.27 | 5.22 | 3.85 | 6.00 | 6.37 | 2.80 | 6.00 |

EXAMPLE 22

The same foaming procedure as described in Example 1 was conducted, except that 10.1 parts (corresponding to 4.0 equivalents based on hydroxyl group of the polyol) of diisopropanolamine and 0.15 part of N-methylmorphorine (amine catalyst) were used. In the foaming procedure, the cream time was 3.0 seconds, the rise time was 42 seconds and a non-shrinkable high resilient polyurethane foam having few closed cells was obtained.

According to the burning test, the foam has a burning extent of 39 mm and an excellent self-extinguishing in term of ASTM D-1692-59T, and further passed the burning test of MVSS-302 and A-A Standard. The smoke emission coefficient $C_{Smax}$ was 0.77 m$^{-1}$ and the smoke emission was low. The foam had a density of 0.0294 g/cm$^3$, a 25% ILD of 4.1 kg, a 65% ILD of 18.3 kg a tensile strength of 0.80 kg/cm$^2$, an elongation of 145%, a tear strength of 0.47 kg/cm, a resilience of 58%, a compression set (50% deflection, 70° C., 22 hours) of 7.44%.

From the results obtained in the above described Examples and Comparative Examples, it is concluded that the use of an aliphatic amino alcohol within the range defined in the present invention has a noticeable effect on providing a flame- and smoke-retardance to polyurethane foams. Moreover, the foams according to the present invention had a high resilience together with favorable general physical properties.

What is claimed is:

1. An excellent flame- and smoke-retardant non-shrinkable polyurethane foam prepared by reacting an organic polyisocyanate with a polyhydroxyl compound consisting of
   (A) a polyol having at least two hydroxyl groups and having a molecular weight from 1,000 to 10,000 and
   (B) at least one aliphatic amino alcohol from the group consisting of diethanolamine, diisopropanolamine, triethanolamine, hydroxyethylated ethylenediamine, hydroxypropylated diethylenetriamine, 2-amino-2-methyl-1,3-propanediol, 2-amino-2-ethyl-1,3-propanediol and tris(hydroxymethyl) aminomethane, in the presence of water and/or other blowing agents, catalysts and surfactants,
   wherein the amount of the aliphatic amino alcohol is 2.1 to 8.0 equivalents per hydroxyl group of the polyol (A).

2. The polyurethane foam according to claim 1, in which the polyol (A) has a molecular weight of 3,000 to 6,000, and a hydroxyl value of 20 to 170 mgKOH/g.

3. The polyurethane foam according to claim 1, in which the polyol (A) is at least one selected from the group consisting of a polyether polyol, a polyester polyol and a polyetherester polyol.

4. The polyurethane foam according to claim 1, in which the polyol (A) is a polyether polyol obtained by the addition polymerization of an initiator containing active hydrogen atoms to one or more alkylene oxides.

5. The polyurethane foam according to claim 4, in which the polyether polyol is poly(oxypropylene) triol.

6. The polyurethane foam according to claim 4, in which the polyether polyol is poly(oxyethylene-oxypropylene) triol.

7. The polyurethane foam according to claim 1, in which the aliphatic amino alcohol is at least one selected from the group consisting of diethanolamine, triethanolamine, diisopropanolamine and 2-amino-2-ethyl-1,3-propanediol.

8. The polyurethane foam according to claim 1, in which the amount of the aliphatic amino alcohol (B) is 3.0 to 7.0 equivalents per hydroxyl group of the polyol (A).

9. The polyurethane foam according to claim 1, in which the organic polyisocyanate is tolylene diisocyanate and/or diphenylmethane diisocyanate.

10. The polyurethane foam according to claim 1, wherein said aliphatic amino alcohol has a molecular weight of 80 to 500 and a hydroxy value of 160 to 600 mgKOH/g.

11. The polyurethane foam according to claim 1, formed by reacting a mixture consisting essentially the recited components.

12. The polyurethane foam according to claim 11, wherein said polyol is a triol, said aliphatic amino alcohol is diethanolamine, said blowing agent is water, said catalyst comprise amine catalysts and stannous octoate and said surfactant is a silicone surfactant.

13. A process for producing an excellent flame- and smoke-retardant non-shrinkable polyurethane foam, which comprises reacting an organic polyisocyanate wiht a polyhydroxyl compound consisting of
   (A) a polyol having at least two hydroxyl groups and having a molecular weight of from 1,000 to 10,000 and
   (B) at least one aliphatic amino alcohol selected from the group consisting of diethanolamine, diisopropanolamine, triethanolamine, hydroxyethylated ethylenediamine, hydroxypropylated diethylenetriamine, 2-amino-2-methyl-1,3-propanediol, 2-amino-2-ethyl-1,3-propanediol and tris(hydroxymethyl)aminomethane
   in the presence of water and/or other blowing agents, catalysts and surfactants, wherein the amount of the aliphatic amino alcohol (B) is 2.1 to 8.0 equivalents per hydroxyl group of the polyol (A).

14. The process of claim 13 which comprises reacting a mixture consisting essentially of the recited components.

15. The process according to claim 13 in which the amount of the aliphatic amino alcohol (B) is 3.0 to 7.0 equivalents per hydroxyl group of the polyol (A).

16. The process of claim 14, wherein said polyol is a triol, said aliphatic amino alcohol is diethanolamine, said blowing agent is water, said catalyst comprise amine catalysts an stannous octoate and said surfactant is a silicone surfactant.

* * * * *